United States Patent [19]

Mikami et al.

[11] 4,443,841
[45] Apr. 17, 1984

[54] NEUTRAL-POINT-CLAMPED PWM INVERTER

[76] Inventors: Wataru Mikami, 2-19-3, Yurigaoka, Ninomiya-cho, Naka-gun, Kanagawa-ken; Kazuo Nagatake, 43 Aza Denjiyama, Narumi-cho, Midori-ku, Nagoya-shi; Takuo Ono, 2-8-1, Azamino, Midori-ku, Yokohama-shi, all of Japan

[21] Appl. No.: 234,915

[22] Filed: Feb. 17, 1981

[30] Foreign Application Priority Data

Feb. 15, 1980 [JP] Japan .................................. 55-18148

[51] Int. Cl.$^3$ ...................... H02M 1/12; H02M 7/537
[52] U.S. Cl. ........................................ 363/41; 363/132
[58] Field of Search ...................... 363/41, 42, 43, 132, 363/136; 318/811

[56] References Cited

U.S. PATENT DOCUMENTS 3,775,663  11/1973  Turnbull .............................. 363/41
4,117,364  9/1978  Baker ................................... 363/43
4,255,783  3/1981  Messer ................................ 363/136

FOREIGN PATENT DOCUMENTS 432642  7/1975  U.S.S.R. .............................. 363/43

OTHER PUBLICATIONS

1980 National Meeting of Denki Gakkai, A. Nabae et al., "New System Inverter for Outputting a Staircase Wave".
Conference: IAS Annual Meeting 1980, Cincinnati, OH, USA, (Sep. 28–Oct. 3, 1980), pp. 761–766, A. Nabae et al., "A Neutral–Point–Clamped PWM Inverter".

*Primary Examiner*—William H. Beha, Jr.
*Attorney, Agent, or Firm*—Cushman, Darby and Cushman

[57] ABSTRACT

A neutral-point-clamped PWM inverter arrangement for reducing output harmonic content. The arrangement includes a DC power source circuit having positive, negative and neutral terminals, a first group of switching elements connected at one end to the power source positive terminal, a second group of switching elements connected at one end to the power source negative terminal and at the other end to the corresponding switching elements of the first group, respectively, a third group of switching elements connected between the power source neutral terminal and the junctions of the switching elements of the first group and the second group, and a fourth group of switching elements connected in parallel with corresponding switching elements of the third group, respectively. Output terminals are connected to points where a switching element of the first group is connected to the corresponding ones of the second group to provide phase output voltages. The switching elements of the first to fourth groups are so controlled that the maximum voltage value is half the voltage applied by the DC power source circuit. The voltage across each phase output terminal and the neutral terminal changes first to the potential of the positive terminal, then to the potential of the neutral terminal, next to the potential of the negative terminal, again to the potential of the neutral terminal and once again to the potential of the positive terminal.

7 Claims, 23 Drawing Figures

NEUTRAL-POINT-CLAMPED PWM INVERTER

BACKGROUND OF THE INVENTION

This invention relates to an inverter device which generates an AC output having a variable frequency, and more particularly to an inverter device which provides an output containing less high harmonic waves.

To control the speed of rotation of an AC motor a power source of variable output frequency is employed to supply the motor with power of a variable frequency. Commonly used as such a power source is an inverter device.

Figure 1:
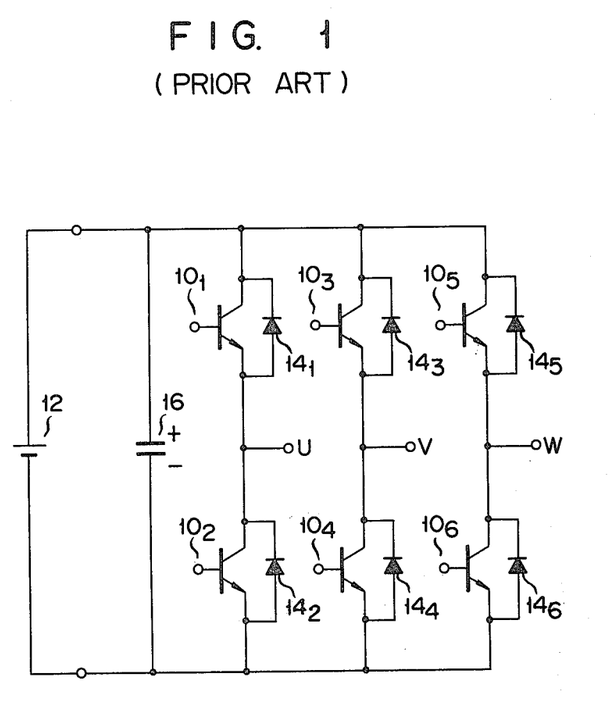
FIG. 1 is a circuit diagram of a known three-phase bridge inverter device.

FIG. 1 is a circuit diagram of a typical three-phase bridge inverter device which has long been used. Transistors are used for switching elements which constitute a three-phase bridge. The arms of the three-phase bridge comprise six transistors, transistors $10_1$, $10_2$, $10_3$, $10_4$, $10_5$ and $10_6$. The point where the transistors $10_1$ and $10_2$ are connected is connected to a phase output terminal U. Similarly, the point where the transistors $10_3$ and $10_4$ are connected is connected to a phase output terminal V, and the point where the transistors $10_5$ and $10_6$ are connected is connected to a phase output terminal W. A DC power source 12 is connected to the bridge circuit to supply power thereto. A flywheel diode $14_1$ is connected between the emitter and collector of the transistor $10_1$. A flywheel diode $14_2$ is connected between the emitter and collector of the transistor $10_1$. Likewise, four other flywheel diodes $14_3$, $14_4$, $14_5$ and $14_6$ are connected to the transistors $10_3$, $10_4$, $10_5$ and $10_6$, respectively. The flywheel diodes $14_1$ to $14_6$ are so connected in order to prevent breakdown of the transistors $10_1$ to $10_6$. Further, a smoothing capacitor 16 is connected between the two terminals of the DC power source 12.

When the transistors $10_1$ to $10_6$ are turned on and off under PWM (pulse width modulation) control, a three-phase AC output is obtained from the phase output terminals U, V and W. The frequency of the three-phase AC output is changed by varying the switching frequency of the transistors $10_1$ to $10_6$.

Figure 2A:
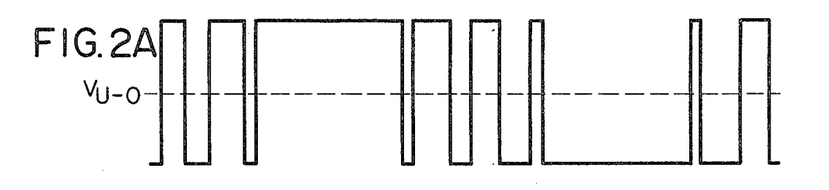
FIGS. 2A to 2E show the waveforms of voltage obtained at principal places in the inverter device of FIG. 1.
Figure 2B:
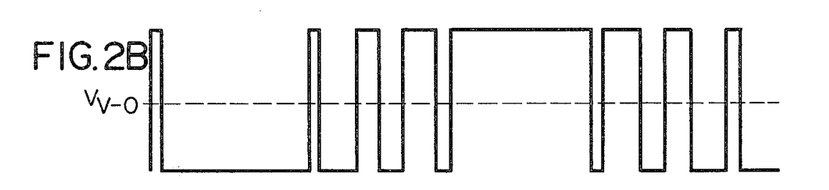
Figure 2C:
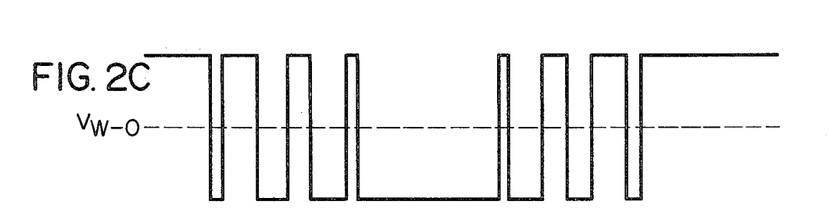
Figure 2D:
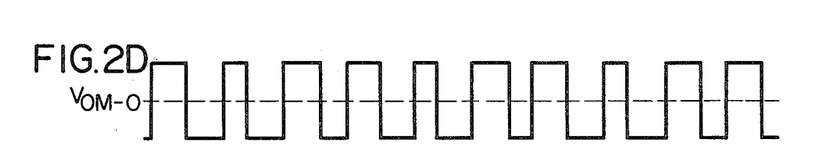
Figure 2E:
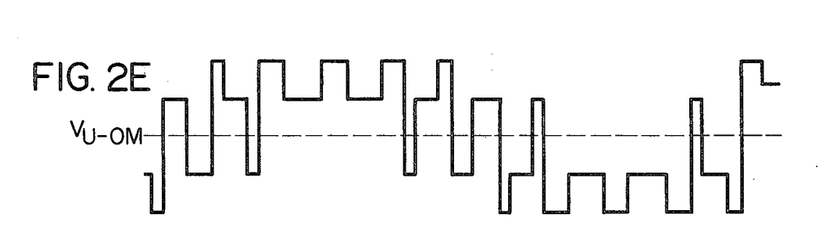

FIGS. 2A to 2E illustrate the waveforms of voltages obtained at principal places of the three-phase bridge inverter device when the transistors $10_1$ to $10_6$ are turned on and off under PWM control. Of these figures, FIG. 2A shows the waveform of voltage $V_{U-O}$ obtained between the phase output terminal U and a neutral point O of the DC power source 12 (point O is an imaginary point and nonexistent in the circuit of FIG. 1), FIG. 2B the waveform of voltage $V_{V-O}$ obtained between the phase output terminal V and the neutral point O, and FIG. 2C the waveform of voltage $V_{W-O}$ obtained between the phase output terminal W and the neutral point O. The voltages waves shown in FIGS. 2A, 2B and 2C are controlled by a control circuit (not shown) so that they become similar and have a phase difference of 120°. FIG. 2D shows the waveform of voltage $V_{OM-O}$ obtained between the neutral point O and a load neutral point OM (i.e. neutral point of three-phase Y-connection). The voltage $V_{OM-O}$ is a composite voltage obtained by combining the three-phase output voltages $V_{U-O}$, $V_{V-O}$ and $V_{W-O}$. FIG. 2E shows the waveform of voltage $V_{U-OM}$ obtained between the phase output terminal U and the load neutral point OM. The voltage $V_{U-OM}$ is a composite voltage obtained by combining the voltage $V_{U-O}$ and the composite voltage $V_{OM-O}$. The voltage $V_{U-OM}$ will be applied to an AC motor if the inverter device of FIG. 1 is used as the power source for the AC motor. If this is the case, the voltage $V_{U-OM}$ will be applied through the phase output terminal U. As FIG. 2E shows, the voltage $V_{U-OM}$ contains many high harmonic waves.

Obviously, it is desired that the output of the inverter device shown in FIG. 1 contain as few high harmonic waves as possible. If an output containing many high harmonic waves is supplied to an AC motor, the operation efficiency of the motor will be reduced and, in addition, torque fluctuation will occur. The inverter device, however, cannot provide an output which contains as few high harmonic waves as desired. It is therefore not suitable as a power source for driving an AC motor.

SUMMARY OF THE INVENTION

It is an object of this invention to provide an inverter device which produces an output containing less high harmonic waves.

To achieve the above-mentioned object an inverter device according to this invention comprises a DC power source circuit having a positive, a negative and a neutral terminal; first switching means connected at one end to the positive terminal of the power source circuit for supplying the voltage of the positive terminal through the other end when rendered conductive; second switching means connected between the other terminal of the first switching means and the negative terminal of the power source circuit for supplying the voltage of the negative terminal through an output terminal when rendered conductive, said output terminal being connected to the point where said first and second switching means are connected; third switching means connected between the neutral terminal of the power source circuit and the point where said first and second switching means are connected and adapted to operate in interlock with the first switching means and to supply the voltage of the neutral terminal through said output terminal when rendered conductive; and fourth switching means connected in parallel to the third switching means and adapted to operate in interlock with the second switching means and to supply the voltage of the neutral terminal through said output terminal when rendered conductive.

The output terminal of the above-mentioned inverter device is connected first to the positive terminal of the DC power source circuit by the first switching means thereby to supply a positive voltage, then to the neutral terminal by the third switching means thereby to supply a neutral voltage, then to the negative terminal by the second switching means thereby to supply a negative voltage, and again to the neutral terminal by the fourth switching means thereby to supply the neutral voltage. Thus, the voltage across the output terminal and the neutral terminal changes from a positive one to a neutral one and finally to a negative one, or vice versa, unlike in the inverter device of FIG. 1 wherein the voltage across the output terminal and the imaginary neutral point O change from a positive one to a negative one, or vice versa, as shown in FIGS. 2A, 2B and 2C. The output voltage of the inverter device according to this invention changes but half as much as the output voltage of the known device. The AC output supplied from the output terminal therefore contains less high harmonic waves than does the AC output obtained by the known inverter device.

BRIEF DESCRIPTION OF THE DRAWINGS

The object of the invention will be seen by reference to the following description, taken in connection with the accompanying drawings, in which.

DETAILED DESCRIPTION OF THE PREFERRED EMBODIMENTS

Figure 3:
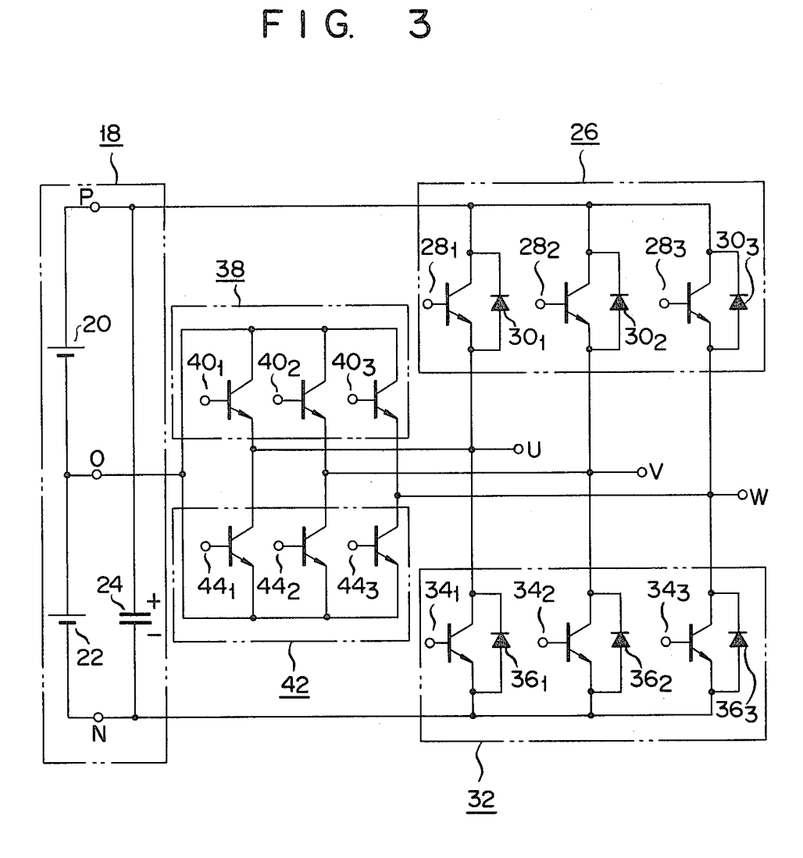
FIG. 3 is a circuit diagram of an embodiment of this invention.
Figure 4A:
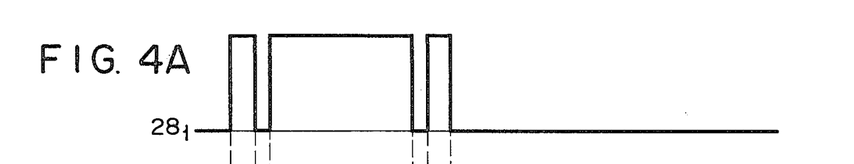
FIGS. 4A to 4D and FIGS. 5A to 5E show the waveforms of voltages obtained at principal places in the inverter device shown in FIG. 3.
Figure 4B:
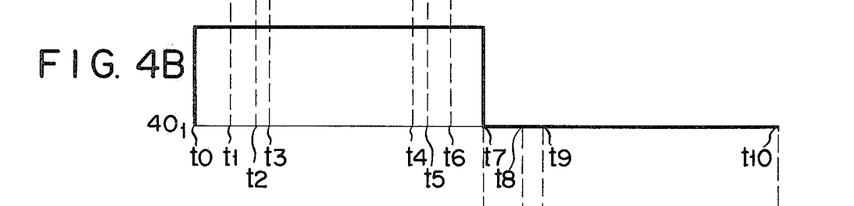
Figure 4C:
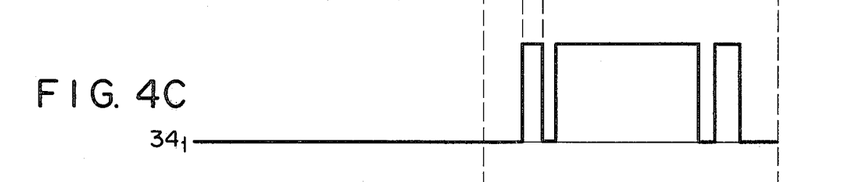
Figure 4D:
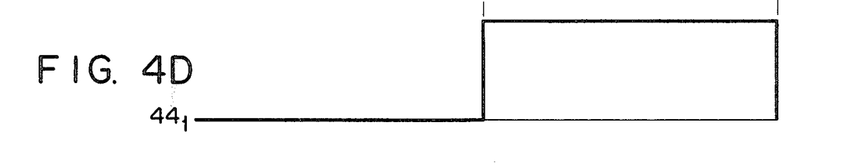

FIG. 3 shows a three-phase bridge inverter device, a first embodiment of this invention. The inverter device comprises a DC power source circuit 18. The circuit 18 consists of a first DC power source 20, a second DC power source 22 connected in series to the first DC power source 20 and a smoothing capacitor 24 connected between two terminals of a series circuit of the DC power sources 20 and 22. The point where the DC power sources 20 and 22 are connected to each other is connected to a neutral terminal O. The inverter device further comprises first switching means 26, second switching means 32, third switching means 38 and fourth switching means 42.

The first switching means 26 comprises three NPN transistors $28_1$, $28_2$ and $28_3$. Each of the transistors $28_1$, $28_2$ and $28_3$ has its collector connected to a positive terminal P of the DC power source circuit 18. The first switching means 26 further comprises three diodes $30_1$, $30_2$ and $30_3$. The diode $30_1$ is connected between the collector and emitter of the NPN transistor $28_1$. Similarly, the diode $30_2$ is connected between the collector and emitter of the NPN transistor $28_2$, and the diode $30_3$ between the collector and emitter of the NPN transistor $28_3$.

The second switching means 32 comprises three NPN transistors $34_1$, $34_2$ and $34_3$ and three diodes $36_1$, $36_2$ and $36_3$. Each of the transistors $34_1$, $34_2$ and $34_3$ has its emitter connected to a negative terminal N of the DC power source circuit 18. The diode $36_1$ is connected between the collector and emitter of the NPN transistor $34_1$. Similarly, the diode $36_2$ is connected between the collector and emitter of the NPN transistor $34_2$, and the diode $36_3$ between the collector and emitter of the NPN transistor $34_3$. Each of the NPN transistors $34_1$, $34_2$ and $34_3$ has its collector connected to the emitter of the corresponding transistor of the first switching means 26. More specifically, the collector of the NPN transistor $34_1$ is connected to the emitter of the transistor $28_1$, the collector of the NPN transistor $34_2$ to the emitter of the transistor $28_2$, and the collector of the NPN transistor $34_3$ to the emitter of the transistor $28_3$. The point where the NPN transistors $28_1$ and $34_1$ are connected is connected to an output terminal U. The point where the NPN trasistors $28_2$ and $28_3$ are connected is connected to an output terminal V. And the point where the NPN transistors $28_3$ and $34_3$ are connected is connected to an output terminal W.

The third switching means 38 comprises three NPN transistors $40_1$, $40_2$ and $40_3$. The collectors of these transistors are connected to the neutral point O of the DC power source circuit 18.

The fourth switching means 42 comprises three NPN transistors $44_1$, $44_2$ and $44_3$. The emitters of these transistors are connected to the neutral point O of the DC power source circuit 18. Each of the transistors $44_1$, $44_2$ and $44_3$ has its collector connected to the emitter of the corresponding transistor of the third switching means 38. More specifically, the collector of the NPN transistor $44_1$ is connected to the emitter of the transistor $40_1$. The collector of the NPN transistor $44_2$ is connected to the emitter of the transistor $40_2$. And the collector of the NPN transistor $44_3$ is connected to the emitter of the transistor $40_3$. The point where the NPN transistors $40_1$ and $44_1$ are connected is connected to the output terminal U. The point where the NPN transistors $40_2$ and $44_2$ are connected is connected to the output terminal V. And the point where the transistors $40_3$ and $44_3$ are connected is connected to the output terminal W.

Every NPN transistor or switching element used in the first embodiment has its base connected to receive a control signal which is supplied at a specific timing from a control circuit (not shown). Instead of an NPN transistor, a PNP transistor, a gate turn-off thyristor, or a thyristor with a proper inverter circuit may be used as a switching element.

The control signal to be supplied to the base of every NPN transistor is determined according to the following formula of Fourier expansion:

$$en = \sum_{k=0}^{m} \frac{4}{\pi} (-1)^m \int_{\alpha_R}^{\alpha_{k+1}} E\sin n\theta \cdot d\theta \qquad (1)$$

$$= \sum_{k=0}^{m} \frac{4}{\pi} (-1)^m \left( \frac{(-1)^k \cos n\alpha_k + (-1)^{k+1}\cos n\alpha_{k+1}}{n} \right)$$

In formula (1), $\alpha_k$ is switching angle ($0=\alpha_0<\alpha_1< \ldots$ $\alpha_{k+1}=\pi/2$, m is the number of switching operations, E is voltage, and n is the degree of harmonic wave. More specifically, such a control signal may be obtained by making a fundamental wave component a desired value, nulling the value of a specific harmonic wave to be removed and by determining such a switching angle and such a number of switching operation. The control signal, the voltage of which is thus determined, is used to achieve PWM control and to remove a harmonic wave of a specific degree. In place of such a control signal use may be made of a rectangular wave signal which is used in the known PWM control.

FIGS. 4A to 4D are a time chart illustrating how a control circuit (not shown) supplies control signals to the NPN transistors $28_1$, $34_1$, $40_1$ and $44_1$ of the three-phase inverter device shown in FIG. 3. FIGS. 5A to 5E illustrate the waveforms of voltages obtained at principal places in the three-phase inverter device shown in FIG. 3 and thus correspond to FIGS. 2A to 2E, respectively.

During a period between time $t_0$ and time $t_1$ the transistor $40_1$ remains on, whereas the transistors $28_1$, $34_1$ and $44_1$ remain off (see FIGS. 4A to 4D). During this period, the output terminal U is connected to the neutral terminal O via the transistor $40_1$ and is disconnected from the positive terminal P and the negative terminal N since the transistors $28_1$ and $34_1$ are off. As a result, the output terminal U is held at the potential of the neutral terminal O, as indicated by FIG. 5A which shows the waveform of voltage $V_{U-O}$ across the output terminal U and the neutral terminal O.

During a period between time $t_1$ and time $t_2$, the transistors $28_1$ and $40_1$ remain on, whereas the transistors $34_1$ and $44_1$ remains off (see FIGS. 4A to 4D). As a result, the output terminal U is connected to the positive terminal P via the transistor $28_1$. Despite the transistor $40_1$ is on, the output terminal U is not connected to the neutral terminal O. This is because the potential of the positive terminal P is higher than that of the neutral terminal O. Disconnected from the negative terminal N and the neutral terminal O, the output terminal U is held at the potential of the positive terminal P (see FIG. 5A).

At time $t_2$ the transistor $28_1$ is turned off, the transistor $40_1$ remains on, and the transistors $34_1$ and $44_1$ remain off. Once the transistor $28_1$ has been turned off, the transistor $40_1$ is no longer affected by the potential of the positive terminal P. As a result, the output terminal U is connected again to the neutral terminal O via the transistor $40_1$. Consequently, the output terminal U is held at the potential of the neutral terminal O until the transistor $28_1$ is turned on at time $t_3$ (see FIGS. 4A–4D and FIG. 5A).

Figure 5A:
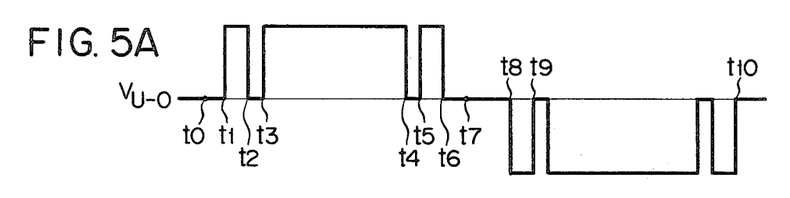

Thus, as shown in FIG. 5A, the output terminal U is held at the potential of neutral terminal O during the period between time $t_2$ and time $t_3$. Thereafter, as illustrated also in FIG. 5A, the output terminal U is held alternately at the potential of the positive terminal P and the potential of the neutral terminal O during the period between time $t_3$ and time $t_4$, the period between time $t_4$ and time $t_5$, the period between time $t_5$ and time $t_6$, the period between time $t_6$ and time $t_7$ and the period between time $t_7$ and time $t_8$.

After the period between time $t_7$ and time $t_8$ the polarity of the potential of the output terminal U may change to a negative one. During the period between time $t_7$ and time $t_8$ the transistor $44_1$ remains on, while the transistors $28_1$, $34_1$ and $40_1$ remain off (see FIGS. 4A to 4D). As a result, the output terminal U is connected to the neutral terminal O via the transistor $44_1$ and is thus held at the potential of the neutral terminal O (see FIG. 5A). At time $t_8$ the transistor $34_1$ is turned on, whereas the transistor $44_1$ remains on and the transistors $28_1$ and $40_1$ remain off (see FIGS. 4A to 4D). The transistor $34_1$ remains on until time $t_9$. Thus, during the period between time $t_8$ and time $t_9$ the transistors $34_1$ and $44_1$ are on and the transistors $28_1$ and $40_1$ are off.

During the period between time $t_8$ and time $t_9$, the output terminal U is connected to the negative terminal N via the transistor $34_1$, but not connected to the neutral terminal O via the transistor $44_1$ because the potential of the negative terminal N is lower than that of the neutral terminal O. Since the output terminal U is disconnected from the positive terminal P and the neutral terminal O during this period, the potential of the output terminal U is equal to that of the negative terminal N (see FIG. 5A).

After time $t_9$ and until time $t_{10}$, as shown in FIG. 5A, the output terminal U is held alternately at the potential of the neutral terminal O and the potential of the negative terminal N.

Since the transistors $28_1$, $34_1$, $40_1$ and $44_1$ are driven with such timing as shown in FIGS. 4A to 4D, the potential of the output terminal U changes from that of the neutral terminal O to that of the positive terminal P or vice versa, or from that of the neutral terminal O to that of the negative terminal N or vice versa. That is, the potential of the terminal U never changes from that of the positive terminal P directly to that of the negative terminal N or the other way around. For this reason, as shown in FIG. 5A, the potential of the output terminal U changes but half as much as an output voltage of the known inverter device. It follows that the inverter device shown in FIG. 3 generates an output which contains about half the number of high harmonic waves that are contained in the output of the known inverter device.

Figure 5B:
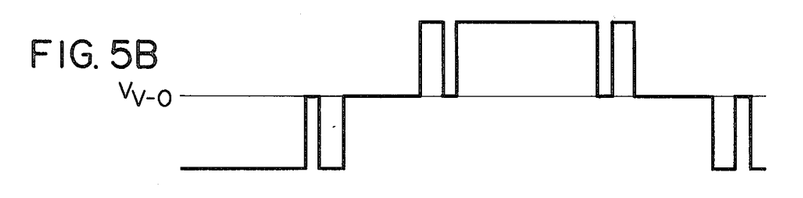
Figure 5C:
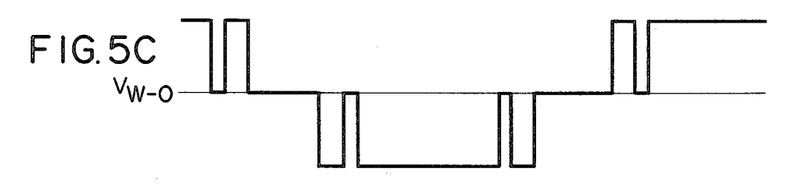
Figure 5D:
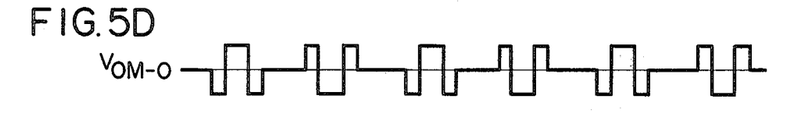
Figure 5E:
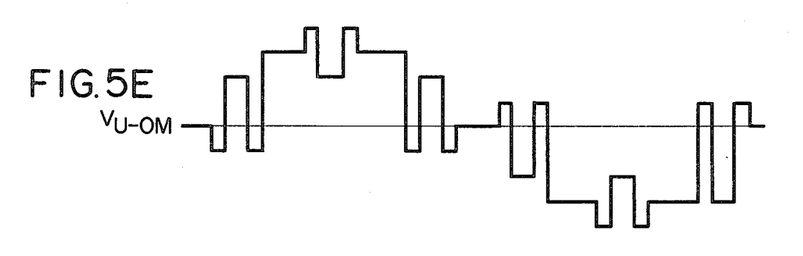

Thus far the description was limited to how the potential of the output terminal U changes as the transistors $28_1$, $34_1$, $40_1$ and $44_1$ are driven by control signals. The above description, however, holds true of the potential of the output terminal V (i.e. voltage $V_{V-O}$ across the terminal V and the neutral terminal O) and of the potential of the output terminal W (i.e. voltage $V_{W-O}$ across the terminal W and the neutral terminal O). FIG. 5B illustrates how the voltage $V_{V-O}$ changes, and FIG. 5C how the voltage $V_{W-O}$ changes. FIG. 5D illustrates how does change the voltage $V_{OM-O}$ across the neutral terminal O and the load neutral point OM, which is a composite voltage or a combination of voltages $V_{U-O}$, $V_{V-O}$ and $V_{W-O}$. Indeed the voltage $V_{OM-O}$ (FIG. 5D) changes as much as the voltage shown in FIG. 2D. But the U-phase voltage $V_{U-OM}$ (FIG. 5E) obtained at the output terminal U, for example, no doubt contains far less high harmonic waves than does the U-phase voltage $V_{U-OM}$ shown in FIG. 2E. The voltage $U_{V-OM}$ (FIG. 5E) is similar to a voltage which consists of fundamental harmonic alone.

Figure 6:
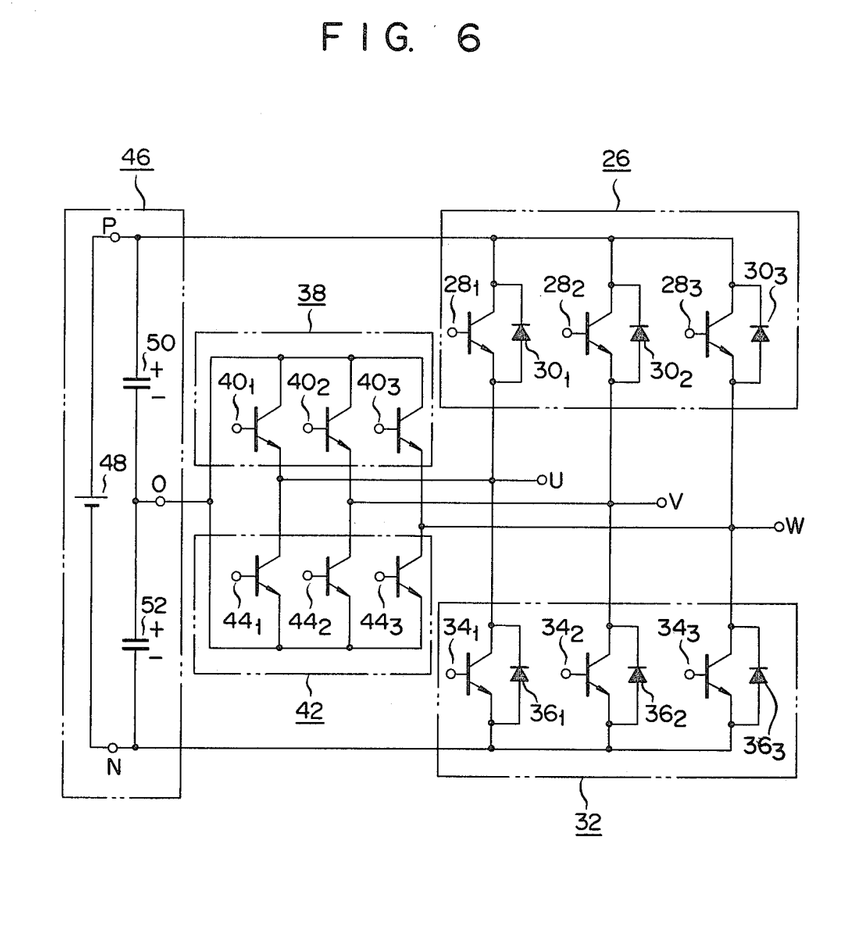
FIG. 6 is a circuit diagram of a second embodiment of this invention.

FIG. 6 shows a second embodiment of this invention, a three-phase bridge inverter device which is identical with the device shown in FIG. 3, except that it includes a DC power source circuit 46 of a different structure. In FIG. 6, like and the same numerals are used to denote like and the same elements as those shown in FIG. 3. The DC power source circuit 46 comprises a DC power source 48, a first capacitor 50 connected at one end to the positive terminal P of the DC power source 48 and a second capacitor 52 connected at one end to the first capacitor 50 and at the other end to the negative terminal N of the DC power source 48. The point where the capacitors 50 and 52 are connected is connected to a neutral terminal O. The inverter device operates basically in the same way as does the device shown in FIG. 3 and can provide a phase output which contains less high harmonic waves than does the phase output of the known inverter device.

Figure 7:
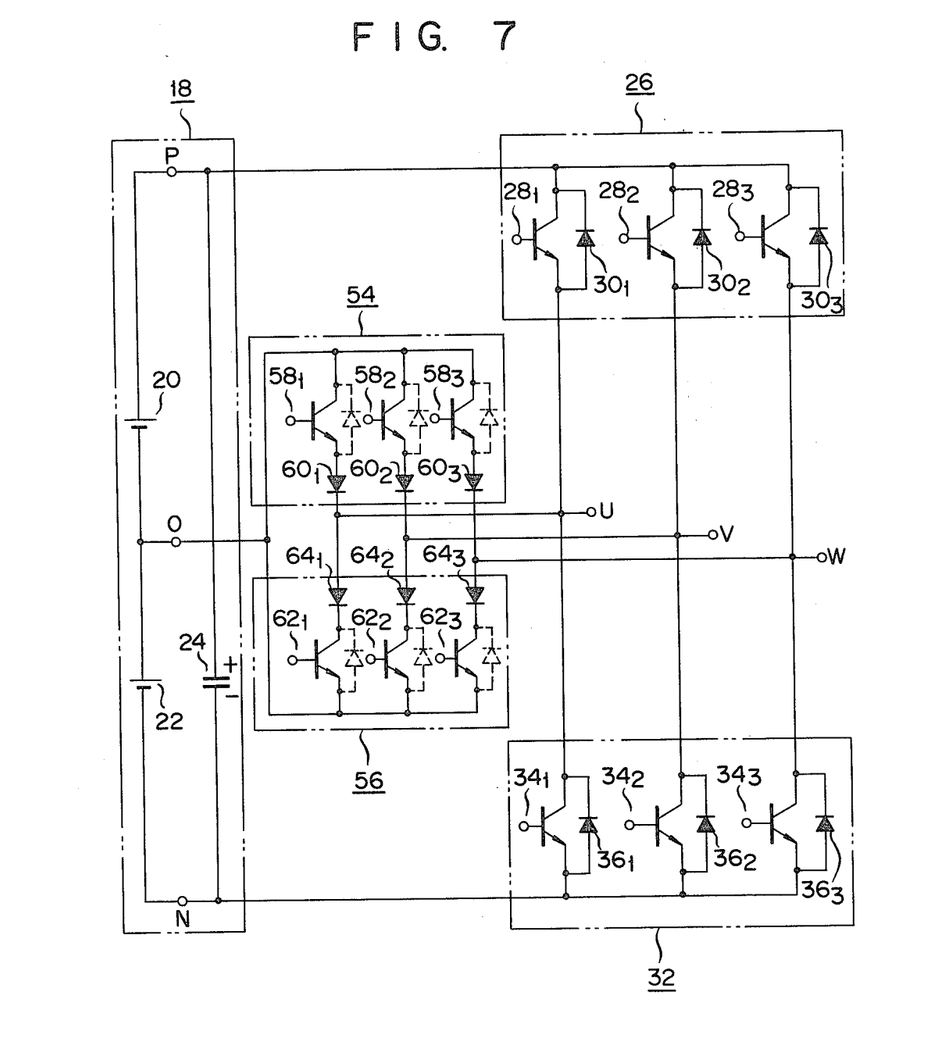
FIG. 7 is a circuit diagram of a third embodiment of this invention.

FIG. 7 shows a third embodiment of this invention, a three-phase bridge inverter device which is identical with the device shown in FIG. 3, except that use is made of a third switching means 54 and a fourth switching means 56, both comprises of NPN transistors and diodes for protecting these PNP transistors. In FIG. 7, like and the same numerals are used to denote like and the same elements as those shown in FIG. 3. The third switching means 54 comprises three NPN transistors $58_1$, $58_2$ and $58_3$ and diodes $60_1$, $60_2$ and $60_3$. The diode $60_1$ is connected between the emitter of the transistor $58_1$ and a phase output terminal U, the diode $60_2$ between the emitter of the transistor $58_2$ and a phase output terminal V, and the diode $60_3$ between the emitter of the transistor $58_3$ and a phase output terminal W. Similarly, the fourth switching means 56 comprises three NPN transistors $62_1$, $62_2$ and $62_3$ and three diodes $64_1$, $64_2$ and $64_3$. The diode $64_1$ is connected between the collector of the transistor $62_1$ and the phase output terminal U, the diode $64_2$ between the collector of the transistor $62_2$ and the phase output terminal V, and the diode $64_3$ between the collector of the transistor $62_3$ and the phase output terminal W. If necessary, three more diodes may be connected to the transistors $58_1$ to $58_3$ and three more diodes may be connected to the transistors $62_1$ to $62_3$ as indicated by broken lines in FIG. 7. If the transistors $58_1$ to $58_3$ and the transistors $62_1$ to $62_3$ are Darlington transistors, inversely conductive diodes may be formed in some cases. If this happens, however, the diodes $60_1$ to $60_3$ and $64_1$ to $64_3$ will block current flowing through the inversely conductive diodes, thus preventing breakdown of the transistors $58_1$ and $58_3$ and the transistors $62_1$ to $62_3$.

Figure 8:
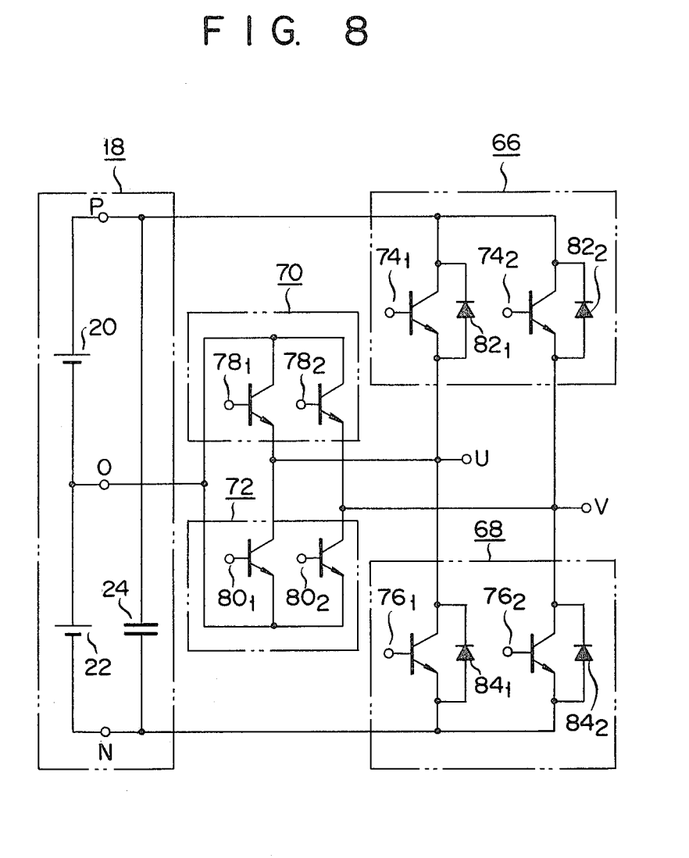
FIG. 8 is a circuit diagram of a fourth embodiment of this invention.

FIG. 8 shows a fourth embodiment of this invention, a single-phase inverter device. In FIG. 8, like and the same numerals are used to designate like and the same elements as shown in FIG. 3. The single-phase inverter device comprises four switching means 66, 68, 70 and 72 like the device of FIG. 3. But each of the switching means comprises two NPN transistors, not three NPN transistors. More precisely, the first switching means 66 comprises NPN transistors $74_1$ and $74_2$ and diodes $82_1$ and $82_2$, the diode $82_1$ being connected between the collector and emitter of the transistor $74_1$ and the diode $82_2$ being connected between the collector and emitter of the transistor $74_2$. Similarly, the second switching means 68 comprises transistors $76_1$ and $76_2$ and diodes $84_1$ and $84_2$, the diode $84_1$ being connected between the collector and emitter of the transistor $76_1$ and the diode $84_2$ being connected between the collector and emitter of the transistor $76_2$. The third switching means 70 comprises NPN transistors $78_1$ and $78_2$. The fourth switching means 72 comprises NPN transistors $80_1$ and $80_2$. The point where the emitter of the transistor $78_1$ is connected to the collector of the transistor $80_1$ is connected to an output terminal U. And the point where the emitter of the transistor $78_2$ is connected to the collector of the transistor $80_2$ is connected to an output terminal V. As clearly understood from FIG. 8, the fourth embodiment is, so to speak, the circuit of FIG. 3 without the elements functionally associated with the output terminal W.

The transistors $74_1$, $76_1$, $78_1$ and $80_1$ functionally associated with the output terminal U receive at base such control signals as shown in FIGS. 4A to 4D. And the transistors $74_2$, $76_2$, $78_2$ and $80_2$ functionally associated with the output terminal V receive at base control signals each of which has a 180° phase difference with respect to the control signal supplied to the corresponding transistor associated with the output terminal U. As a result, the potential of each output terminal changes from the potential of the neutral terminal O of a power source circuit 18 to that of either the positive terminal P or negative terminal N thereof. The fourth embodiment can therefore provide an AC output which contains less high harmonic waves than does an AC output obtained by the known inverter device of FIG. 1.

Figure 9A:
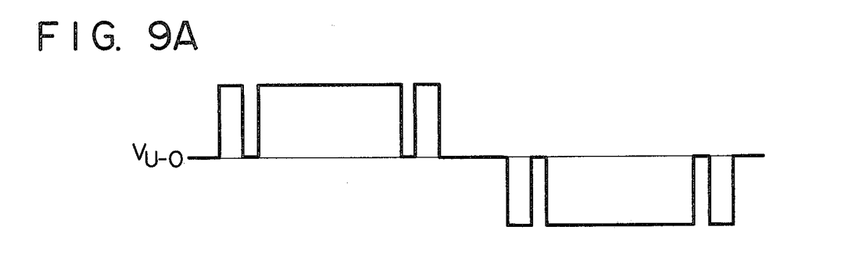
FIGS. 9A to 9D show the waveforms of voltage obtained at principal places in the inverter device of FIG. 8.
Figure 9B:
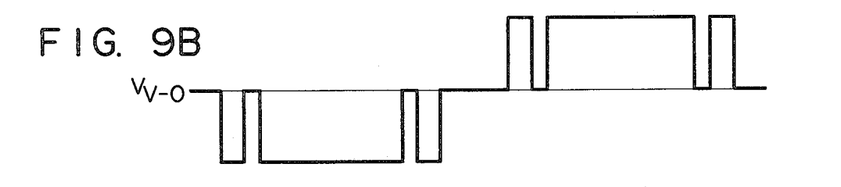
Figure 9C:
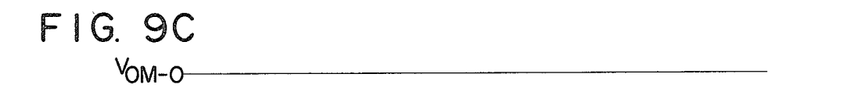
Figure 9D:
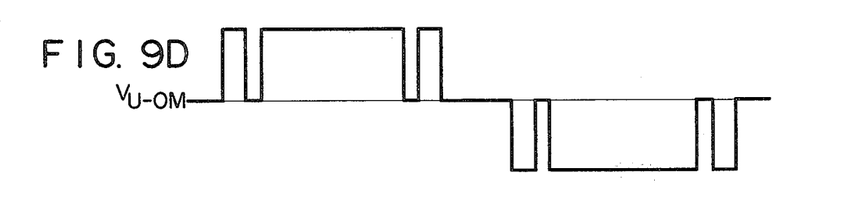

With reference to FIGS. 9A to 9D it will be described more in detail how the potentials of the output terminals U and V change as the transistors $74_1$, $76_1$, $78_1$ and $80_1$ and the transistors $74_2$, $76_2$, $78_2$ and $80_2$ are driven by the control signals. FIG. 9A shows how the voltage $V_{U-O}$ between the output terminal U and the neutral terminal O changes, and FIG. 9B illustrates how the voltage $V_{V-O}$ between the output terminal V and the neutral terminal O changes. As shown in FIGS. 9A and 9B, the potential of either output terminal changes from the potential of the neutral terminal O to that of the positive terminal P or the negative terminal N, or vice versa. It never changes from the potential of the positive terminal P directly to that of the negative terminal N. Accordingly the voltage $V_{OM-O}$ between the neutral terminal O and a load neutral point OM remains equal to the potential of the neutral terminal O all the time, as shown in FIG. 9C. Further, the voltage $V_{U-OM}$ between the output terminal U and the load neutral point OM changes exactly in the same way as the voltage $V_{U-O}$, as illustrated in FIG. 9D. Consequently, the output terminal U provides an AC output the waveform of which is identical with that of the control signals supplied to the bases of the transistors $74_1$ and $76_1$. The inverter device of FIG. 8 can therefore generate a single-phase output voltage containing less high harmonic waves.

The three-phase inverter devices of FIGS. 6 and 7 may easily be made into a single-phase inverter device merely by using two NPN transistors, not three NPN transistors, as shown in FIG. 8 to form each switching means.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What we claim is:

1. An inverter device comprising:
   a DC power source circuit having a positive, a negative and a neutral terminal;
   first switching means connected at a first terminal thereof to the positive terminal of the power source circuit for supplying the positive terminal voltage at a second terminal of the first switching means when rendered conductive;
   second switching means having a first terminal connected to the second terminal of the first switching means and a second terminal connected to the negative terminal of the power source circuit for supplying the negative terminal voltage at the first terminal of the second switching means when rendered conductive;
   an output terminal connected to said first terminal of said second switching means and second terminal of said first switching means;
   third switching means connected between the neutral terminal of the power source circuit and the point where said first and second switching means are connected for operating in interlock with the first switching means and supplying the voltage of the neutral terminal through said output terminal when rendered conductive; and
   fourth switching means connected in parallel to the third switching means for operating in interlock with the second switching means and supplying the voltage of the neutral terminal through said output terminal when rendered conductive.

2. An inverter device according to claim 1, wherein said DC power source circuit comprises a first DC power source; a second DC power source connected in series with the first DC power source, the point where the first and second DC power sources are conneted being connected to the neutral terminal; and a capacitor connected between the terminals of a series circuit including the first and second DC power sources.

3. An inverter device according to claim 1, wherein said DC power source circuit comprises a DC power source; a first capacitor connected at one end to the positive terminal of the DC power source; and a second capacitor connected between the other end of the first capacitor and the negative terminal of the DC power source, the point where the first and second capacitors are connected being connected to the neutral terminal.

4. An inverter device according to claim 1, wherein each of said first, second, third and fourth switching means comprises a plurality of switching elements, the switching elements of said third switching means being controlled in interlock with those of said first switching means and the switching elements of said fourth switching means being controlled in interlock with those of said second switching means.

5. An inverter device according to claim 4, wherein the switching elements of each switching means are transistors.

6. An inverter device according to claim 5, wherein each of said first and second switching means comprises a number of NPN transistors and the same number of diodes for absorbing an abnormal voltage, each diode being connected between the collector and emitter of the corresponding NPN transistor, the collectors of the NPN transistors constituting said first switching means being connected to said positive terminal of said DC power source circuit and the emitters thereof being connected respectively to the collectors of the NPN transistors constituting said second switching means, the point where the collector of each NPN transistor of said first switching means is connected to the emitter of the corresponding NPN transistor of said second switching means being connected to an output terminal, and the emitters of the NPN transistors constituting said second switching means being connected to the negative terminal of said DC power source circuit, whereby the voltage of the positive terminal is obtained from the output terminal when the NPN transistors of said first switching means are rendered conductive and the voltage of the negative terminal is obtained from the output terminal when the NPN transistors of said second switching means are rendered conductive.

7. An inverter device according to claim 5, wherein each of said third and fourth switching means comprises transistors the number of which is equal to that of the transistors constituting each of said first and second switching means, the collectors of the transistors constituting the third switching means being connected to the neutral terminal of said DC power source circuit and the emitters thereof being connected respectively to the collectors of the transistors constituting said fourth switching means, the point where the collector of each transistor of said third switching means is connected to the emitter of the corresponding transistor of said fourth switching means being connected to the output terminal, and the emitters of the transistors constituting said fourth switching means being connected to the neutral terminal of said DC power source circuit, whereby the voltage of the neutral terminal is obtained from the output terminal when the transistors of the third or fourth switching means are rendered conductive.

* * * * *